(12) United States Patent
Li (10) Patent No.: US 7,493,933 B2
(45) Date of Patent: Feb. 24, 2009

(54) RETRACTABLE WINDOW SHADE

(76) Inventor: Xinia Li, 9855 Lower Azusa Rd. #I, Temple City, CA (US) 91780

( * ) Notice: Subject to any disclaimer, the term of this patent is extended or adjusted under 35 U.S.C. 154(b) by 0 days.

(21) Appl. No.: 11/504,162

(22) Filed: Aug. 15, 2006

(65) Prior Publication Data

US 2008/0041540 A1    Feb. 21, 2008

(51) Int. Cl.
   - B60J 1/20    (2006.01)
   - B60J 3/00    (2006.01)
   - B60J 11/00   (2006.01)
   - A47G 5/02    (2006.01)

(52) U.S. Cl. ............ 160/370.22; 160/310; 296/97.8; 296/142

(58) Field of Classification Search ......... 160/121.1, 160/273, 310, 311, 315, 370, 370.21, 370.22; 192/69.1, 69.2, 69.61, 69.62; 296/97.1, 97.4, 296/97.7, 97.8
See application file for complete search history.

(56) References Cited

U.S. PATENT DOCUMENTS

| | | | |
|---|---|---|---|
| 2,314,193 A * | 3/1943 | Boor et al. .............. 73/851 |
| 4,429,729 A * | 2/1984 | Winslow .............. 160/315 |
| 4,836,263 A | 6/1989 | Ament | |
| 4,921,299 A * | 5/1990 | Herrick .............. 296/97.8 |
| 5,344,206 A * | 9/1994 | Middleton .......... 296/97.8 |
| 5,443,300 A * | 8/1995 | Mohammed ........... 296/97.4 |
| 5,860,466 A * | 1/1999 | Kao .............. 160/370.22 |
| 5,915,447 A | 6/1999 | Lassen | |
| 5,947,544 A | 9/1999 | Hubeshi | |
| 6,047,762 A | 4/2000 | Anderson | |
| 6,086,133 A * | 7/2000 | Alonso .............. 296/97.8 |
| 6,536,829 B2 | 3/2003 | Schlecht et al. | |
| 6,547,307 B2 | 4/2003 | Schlecht et al. | |
| 6,668,902 B2 | 12/2003 | Bong | |
| 6,675,862 B2 | 1/2004 | Kobayashi et al. | |
| 6,776,211 B2 | 8/2004 | Schlecht et al. | |
| 6,796,599 B2 | 9/2004 | Schlecht et al. | |
| 6,834,705 B2 | 12/2004 | Seel | |
| 6,848,493 B1 | 2/2005 | Hansen et al. | |
| 2003/0006630 A1 * | 1/2003 | Kralik et al. ........... 296/214 |
| 2003/0094249 A1 | 5/2003 | Zimmermmann et al. | |
| 2004/0040672 A1 | 3/2004 | Nagar | |
| 2004/0104000 A1 | 6/2004 | Messerschmidt et al. | |
| 2004/0144506 A1 | 7/2004 | Walter et al. | |
| 2005/0051285 A1 | 3/2005 | Yano et al. | |
| 2005/0092449 A1 | 5/2005 | Weinbrenner et al. | |

* cited by examiner

Primary Examiner—Katherine W Mitchell
Assistant Examiner—Jeremy C Ramsey
(74) Attorney, Agent, or Firm—Gary F. Wang (57) ABSTRACT

A retractable window shade comprises at least one spool assembly and at least one track assembly. The spool assembly includes a spool having film windable thereupon with opposing film edges. The film edges have a series of spaced perforations extending therealong. The spool assembly further comprises a motor and clutch assembly configured to rotatably couple the motor to the spool. The track assembly is oriented laterally outwardly relative to the spool assembly and includes a drive chain that is engaged to a sprocket which is coupled to the motor. The drive chain is configured to the engage the perforations of the film for extending and retracting the film during activation of the motor.

10 Claims, 7 Drawing Sheets

RETRACTABLE WINDOW SHADE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates generally to window shade systems and, more particular, to a retractable window shade that is moveably disposed adjacent to or against a window or windshield of a motor vehicle and which is specifically adapted to prevent light from passing through gaps between the window shade edges and the window.

The prior art includes various systems for shading the interior of a motor vehicle. Many of such prior art shading systems are configured to be alternately extended and retracted so as to provide varying degrees of protection from sunlight. Many of the prior art window shading systems appear to provide a device wherein the leading edge the film member is pushed and pulled in order to expand and retract the film member along the window.

Notably, many of such prior art window shading systems disclose devices wherein the edges or sides of the film member are freely disposed. More specifically, many of the devices in the prior art are understood to provide an arrangement wherein gaps may exist between edges of the window and edges of the film member such that light may easily enter the interior of the motor vehicle.

For example, U.S. Pat. No. 5,947,544 issued to Hubeshi (the Hubeshi reference) discloses an electromechanical sun visor for a motor vehicle window. The electromechanical sun visor includes a sun shade screen which is rolled onto a spring-loaded takeup roller of a roller housing which is attached to an interior of the roof of the vehicle. A rotatable shaft is driven in forward and backward directions with a bidirectional electric motor connected to a battery of the motor vehicle in order to retract and extend the sun shade screen.

Microswitches are included in order to detect the retracted and deployed positions of the sun shade screen. The Hubeshi reference specifically provides that the sun shade screen is frictionally extended and retracted by a pair of rubber-like pulleys through which the sun shade screen passes. In this regard, the Hubeshi reference discloses a sun shade mechanism wherein the screen is drivingly extended and retracted at the edges of the sun shade film member. Unfortunately, the Hubeshi reference is not understood to provide a means for eliminating gaps occurring between edges of the sun shade screen and the window.

As may be appreciated, the desired purpose of installing a sun shade screen in an interior of a motor vehicle is to block sunlight and thereby limit the interior temperature of the motor vehicle. Furthermore, the addition of the sun shade screen to a motor vehicle provides a safer and more comfortable environment for drivers and passengers. Finally, the inclusion of a sun shade screen in a motor vehicle creates a luxury look for the motor vehicle. As may be appreciated, the ability to completely prevent the entry of sunlight into the motor vehicle provides many advantages.

As can be seen, there exists a need in the art for a retractable window shade that is moveable disposed adjacent to a window of a motor vehicle and which is specifically configured to shade the entire window of the motor vehicle. More specifically, there exist a need in the art for a retractable window shade that is configured to eliminate gaps occurring between film edges of the window and the window itself. Additionally, there exists a need in the art for a retractable window shade that may be adapted for installation in a concealed manner adjacent a windshield at the opposing body pillars located on opposite sides of the windshield.

Furthermore, there exists a need in the art for a retractable window shade that is adapted for installation on an interior of side door windows of a motor vehicle such that the film can be alternately deployed and retracted and thereby block the entry of sunlight into the motor vehicle according to the individual desires of the driver and passengers. Also, there exists a need in the art for a retractable window shade that is of simple construction and of low cost such that the retractable window shade may be cost-effectively installed in various types of motor vehicles including automobiles, trucks, airplanes, trains, boats and ships.

BRIEF SUMMARY OF THE INVENTION

The present invention specifically addresses the above-referenced needs associated with window shades. More specifically, the present invention is a uniquely configured retractable window shade that is specifically adapted to be alternately retracted and deployed along an interior side of a windshield, a rear window or side windows of a motor vehicle such as an automobile. Advantageously, the retractable window shade includes a pair of track assemblies mounted on upper and lower edges of the windshield or rear window which eliminates the occurrence of gaps between the film edges and the windshield to prevent light from passing therethrough.

The retractable window shade comprises a spool assembly and a pair of track assemblies. The spool assembly includes a mounting assembly, a spool, a motor and a clutch assembly. The mounting assembly may be comprised of a base bracket to which a spaced pair of end brackets are mounted. Furthermore, a pair of end plates may be mounted to the base bracket and disposed in spaced parallel relation to the end brackets. The spool comprises a spool shaft that is supported by the end plates and end brackets. A spaced pair of end caps are mounted on the spool shaft and are support a spool drum. The spool drum is supported by the end plates and is rotatable on the spool shaft.

Film for providing shading to the motor vehicle is windably disposed upon the spool drum. The film can be provided in varying degrees of shading. Importantly, the film has opposing film edges each having equidistantly spaced perforations extending therealong. The film also has a leading edge which retracts and deploys along the windshield or rear window. The film also has a trailing edge which is secured to the spool drum.

The motor is preferably a reversible motor which has a motor shaft extending axially outwardly therefrom and which terminates at a motor gear. The clutch assembly is axially moveable and is configured to rotatably couple the spool to the motor in order to effectuate rotation thereof during activation of the motor. The clutch assembly comprises a clutch gear, a sling, a main gear and a sleeve gear. The clutch gear is axially slideable on the spool shaft and has opposing sides.

A circumferential clutch groove is disposed on one of the sides and a plurality of clutch posts extend axially outwardly from the other one of the sides of the clutch gear. The clutch groove is sized and configured complementary to a pair of fork members of the axially moveable fork. The fork is operative to selectively couple the clutch gear to the sleeve gear. The main gear is rotatably mounted on the spool shaft and is engaged to the motor gear. A plurality of holes extend axially through the main gear and are preferably equal in quantity to the quantity of clutch posts disposed on the clutch gear.

The sleeve gear is also rotatably mounted on the spool shaft and is disposed on the side of the main gear opposite that from which the clutch gear is mounted. The sleeve gear includes a plurality of bores equal in quantity to the number of clutch posts. The bores extend at least partially into the sleeve gear for receiving the clutch posts therein when the clutch gear is moved by the fork. In this manner, axial movement of the fork effectuates engagement of the clutch posts to the bores which effectuates rotation of the sleeve gear in unison with the main gear. A pair of stop members disposed on one end of the spool drum as well as on the sleeve gear causes rotation of the spool drum during engagement therebetween.

The retractable window shade may further include a roller spindle and a sprocket spindle. The roller spindle is rotatably supported by the end plates and it configured to apply even and uniform pressure to the film during winding and holds the film to its place. The sprocket spindle is also rotatably supported by the end plates and has a sprocket gear engaged to the motor gear such that activation of the motor results in rotation of the sprocket spindle. A pair of sprockets are disposed on opposite ends of the sprocket spindle.

Each of the pair of track assemblies is preferably disposed in general alignment with the film perforations of the opposing edges of the film. A drive chain supported by the track assemblies and engaged to the sprockets is specifically adapted to engage the perforations of the film and is hooked on the chain post in order to push and pull the film along the track assembly during deployment of the film along the windshield or rear window.

BRIEF DESCRIPTION OF THE DRAWINGS

These as well as other features of the present invention will become more apparent upon reference to the drawings wherein.

DETAILED DESCRIPTION OF THE INVENTION

Referring now to the drawings wherein the showings are for purposes of illustrating various aspects of the present invention and not for purposes of limiting the same, shown is a retractable window shade 10 which is specifically adapted to be extended and retracted along a pair of track assemblies 98 mounted on upper and lower edges of a window such as a windshield 150. The retractable window shade 10 is specifically adapted to minimize or eliminate the occurrence of gaps between edges of a sun-blocking or sun-shading film 86 and the windshield 150. In a further embodiment, the retractable window shade 10 may be mounted within a passenger door or driver door of a motor vehicle and may be deployed and retracted along the main window or a rear window of the passenger door.

Referring to FIGS. 1-5, shown is the retractable window shade 10 in an embodiment specifically adapted to extend and retract along the windshield 150 or rear window of a motor vehicle. The retractable window shade 10 includes a film 86 that may be moveably disposed adjacent to or against the windshield 150 on an interior side thereof. In this manner, the retractable window shade 10 protects the inside of the motor vehicle, (e.g., an automobile) against light such as sunlight by blocking the entry thereof into the passenger compartment and thereby limiting the temperature of the motor vehicle interior.

Figure 1:
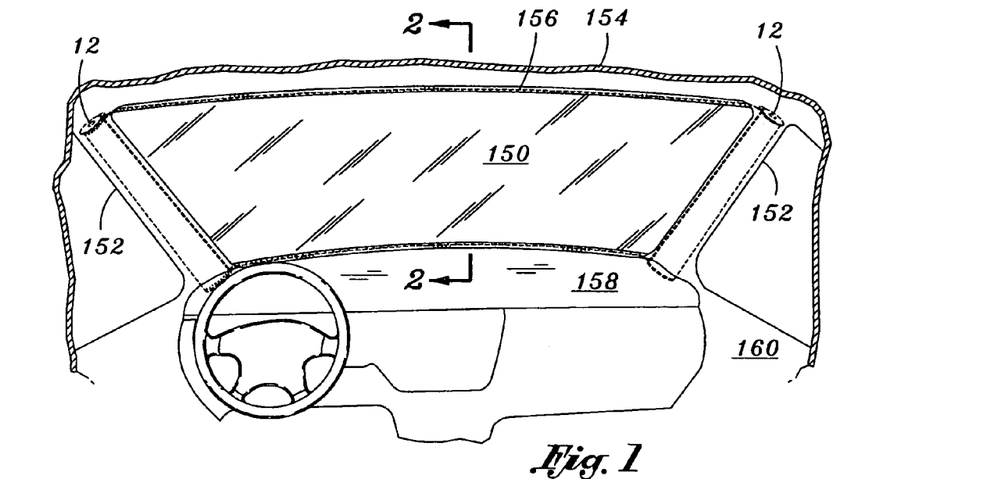
FIG. 1 is a plan view of a windshield of a motor vehicle and illustrating a pair of retractable window shades installed on opposing sides of the windshield.

In its broadest sense, the retractable window shade 10 is comprised of at least one and, preferably, a pair of spool assemblies 12 and at least one and, preferably, a pair of track assemblies 98. The pair of the spool assemblies 12 may be mounted on opposing sides of the windshield 150 on an inside thereof. More specifically, each one of the spool assemblies 12 may be mounted within a pillar 152 on opposite sides of the windshield 150 or rear widow and which typically extends from the hood portion to the roof 154 portion of the automobile. The retractable window shade 10 may have two of the spool assemblies 12 installed in the front two pillars 152 on opposing sides of the windshield 150 or rear window.

In this arrangement, the film 86 may be extended from either and/or both of the spool assemblies 12 to provide alternating degrees of shading due to the ability to overlap or superimpose the film 86 on top of one another to the extent degree or amount. It is contemplated that the pillars 152 in the automobile may be retrofitted with pillars 152 that are specifically adapted to have the spool assemblies 12 contained therewithin. Such pillars 152 may include a gap or slit extending generally along the pillar through which the film 86 may pass as it is extended and retracted along the windshield 150, rear window or other window element. The track assemblies 98 may be mounted adjacent to or along respective ones of the upper and lower edges of the windshield 150. Preferably, the track assemblies 98 and spool assemblies 12 are mounted such that the film 86 is spaced a small distance from the windshield 150 such as about five millimeters from the windshield 150.

The retractable window shade 10 may also be installed adjacent the rear window of the motor vehicle in the same arrangement as was previously described for the windshield 150. It is further contemplated that the film 86 may be of varying tint or color in order to provide varying degrees of shading for the motor vehicle interior. For example, the left side of the motor vehicle may have a spool assembly 12 with a dark brown-colored film 86 while the spool assembly 12 installed on the right side of the windshield 150 may have a black-colored film 86, or vice versa. Depending on the amount of shading that is desired in the interior of the motor vehicle, either one or both of the spool assemblies 12 may be extended across the windshielfd 150.

Figure 3:
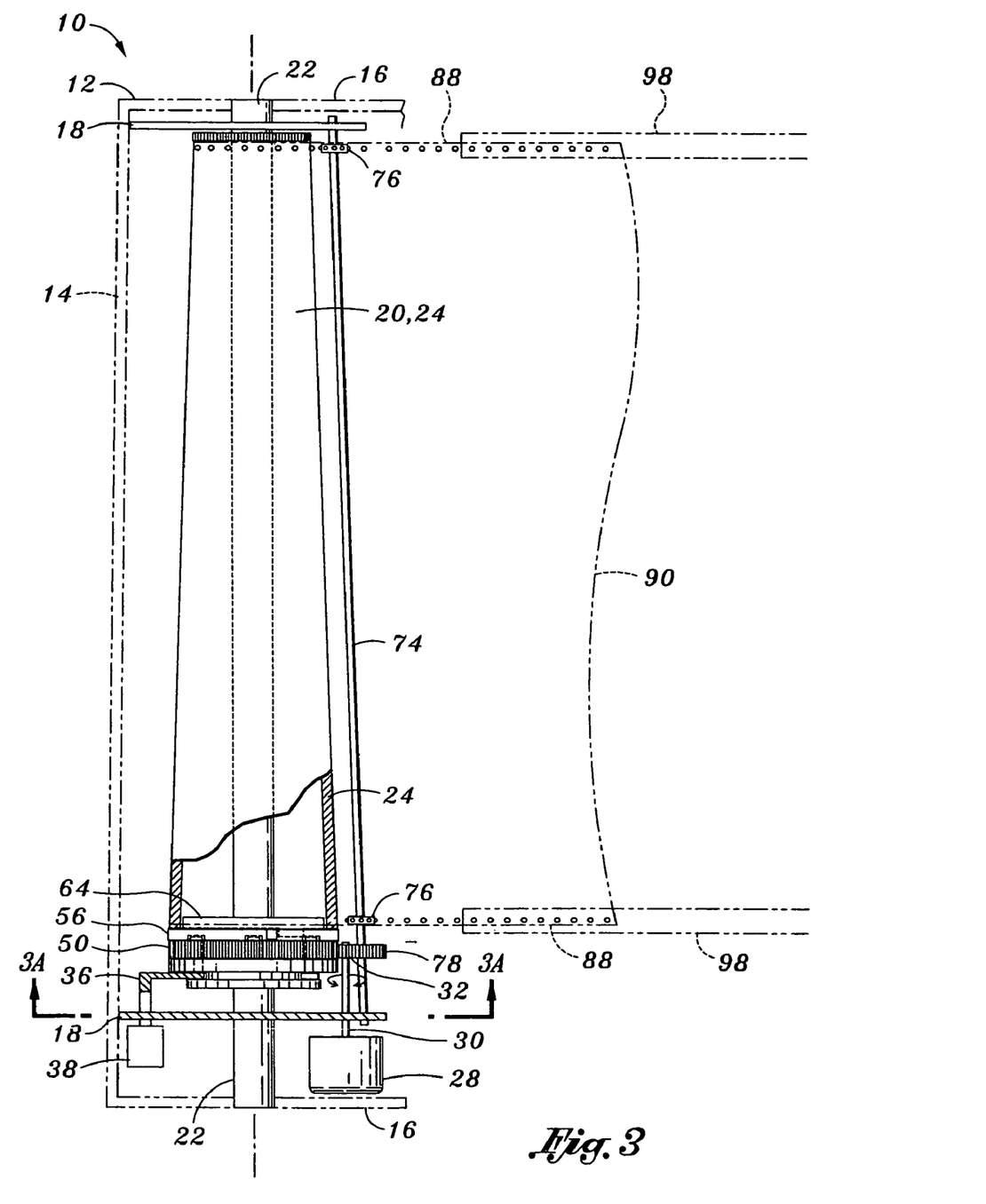
FIG. 3 is a top view of a spool assembly such as may be mounted adjacent to one of the opposing sides of the windshield and further illustrating a mounting assembly, a spool, a motor and a clutch assembly that make up the spool assembly.
Figure 3C:
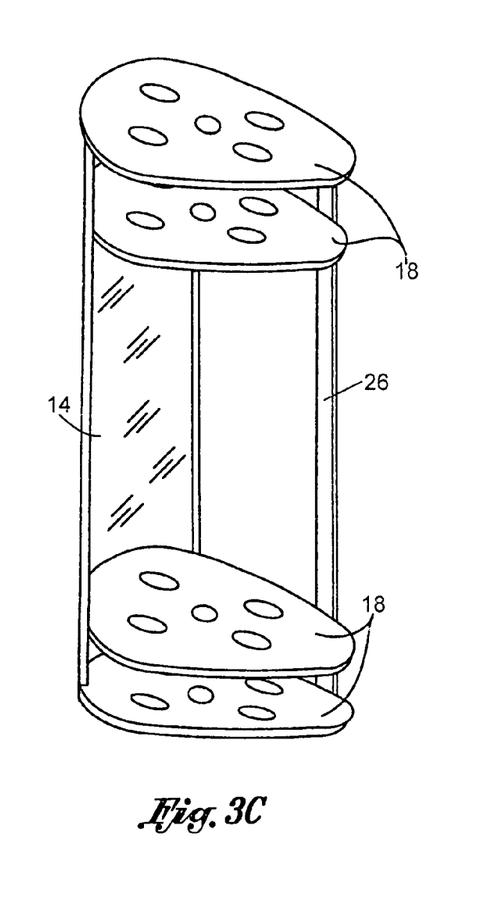
FIG. 3c is a perspective view of a bracket assembly similar to that which is shown in FIG. 3.
Figures 4, 5:
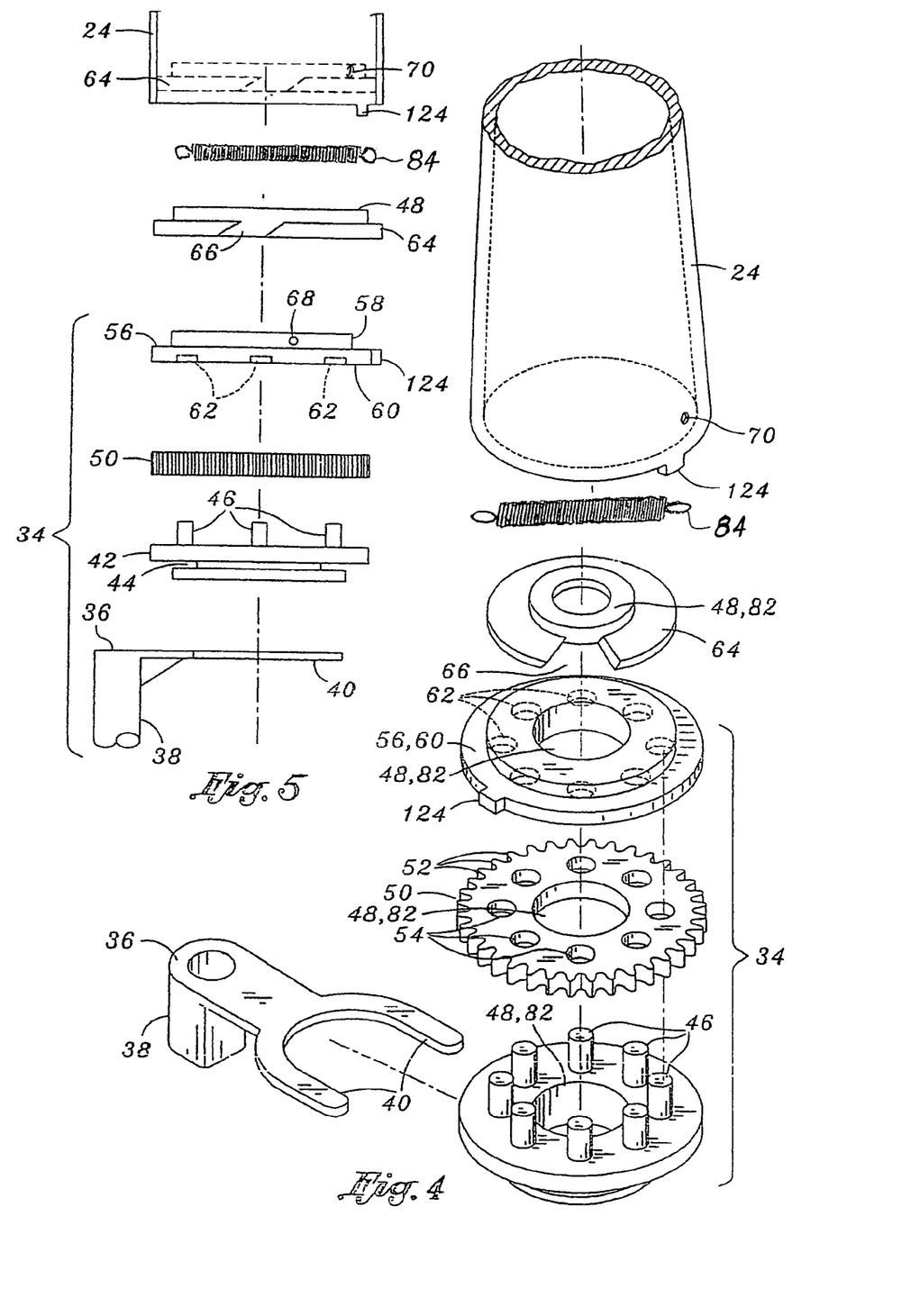
FIG. 4 is a partially exploded perspective view of the clutch assembly showing its innerconnectivity to the spool.
FIG. 5 is an exploded side view of an end cap, sleeve gear, main gear, clutch gear and sling that make up the clutch assembly.

Referring now to FIGS. 3-5, shown is the spool assembly 12 that may comprise a mounting assembly, a spool 20, a motor 28 and a clutch assembly 34. As can be seen in FIGS. 3 and 3c, the mounting assembly has proximal and distal ends with the motor 28 being disposed at the proximal end. As shown in FIG. 3c, the mounting assembly includes a frame for the spool assembly 12 and may be comprised of a base bracket 14 to which may be secured by a spaced pair of end brackets 16 that are disposed at respective proximal and distal ends of the base bracket 14. The mounting assembly may be utilized to secure the spool assembly 12 to the motor vehicle and, more specifically, to secure the spool assembly 12 to the pillar 152 adjacent the side of the windshield 150. Disposed in spaced relationship to each one of the end brackets 16 may be a pair of end plates 18 that are also mounted to the base bracket 14.

Passing through each of the end plates 18 and supported by the end brackets 16 is a spool shaft 22 of the spool 20. As can be seen in FIGS. 3 and 3d, the spool shaft 22 is supported at opposing ends by the end plates 18 and the end brackets 16. The spool 20 is further comprised of a spaced pair of end caps 64 that are bearingly supported on the spool shaft 22. In addition, an elongate and generally conically shaped spool drum 24 is fixedly mounted on the end caps 64. The spool drum 24 may taper to a point or it may assume a truncated conical shape. As can be seen, the spool drum 24 is generally a hollow shaped conical member rotatably mounted on the spool shaft 22. Optionally, each of the end caps 64 may include a bearing 82 such that the spool drum 24 is rotatable relative to the spool shaft 22. The sun-blocking or sun-shading film 86 is windably mounted or rolled onto the spool drum 24.

Importantly, the film 86 has opposing film 86 edges with spaced perforations 88 extending along each of the film 86 edges. The perforations 88 are preferably equidistantly spaced apart although the perforations 88 may be provided in any number and in any spacing. The film 86 has a leading edge 90 and a trailing edge 92 with the leading edge 90 being extendable and retractable along the windshield 150. The trailing edge 92 is secured to the spool drum 24 and, for this purpose, may include a tab or tabs which may be inserted into slots formed in the spool drum 24 to anchor the film to the spool drum. Alternatively, the trailing edge 92 of the film 86 may be secured to the spool drum 24 by various other means such as with adhesive and/or mechanical fasteners.

Referring briefly to FIGS. 3a-3d, shown is the end plate 18 located on a proximal end of the mounting assembly. As can be seen, the end plate 18 has the spool shaft 22 extending therethrough and further includes provisions for mounting the motor 28. Furthermore, the end plate 18 is adapted for mounting a roller spindle 72 and a sprocket spindle 74. As can be seen in FIG. 3, both the roller and the sprocket spindles 72, 74 extend between the end plates 18 and are driven by the motor 28 in a manner that will be described in detail below.

The roller spindle 72 is specifically adapted to apply a slight amount of pressure to the film 86 as it is wound onto the spool drum 24. Furthermore, the roller spindle 72 is adapted to accommodate the gradually increasing diameter of the film 86 on the spool drum 24 as the film 86 is wound therearound. In addition, the roller spindle 72 preferably includes teeth at the top end thereof. Such teeth may be cooperatively engaged to an end gear disposed on the distal end of the mounting bracket. The end gear rotates in a direction opposite that of the main gear but also rotates in unison therewith. More specifically, a motor gear 32 drives a sprocket gear 78 and main gear 50 which collectively cause the sprocket spindle 74 to rotate which then unrolls the film 68 off of the spool drum 24 and extends the film 86 out along the windshield 150. Retraction and windup of the film 68 upon the spool drum 24 is effectuated by reversing the rotational direction of the motor gear 32.

The sprocket spindle 74 is also cooperatively engaged to the main gear 50 via a sprocket gear 78. The sprocket spindle 74 includes a pair of sprockets 76 mounted in alignment with opposing edges of the film 86. As will be described in greater detail below, the sprocket 76 includes a set of sprocket teeth 80 extending radially outwardly which engage a drive chain 94. The drive chain 94 is preferably comprised of a series of chain links connected end-to-end in a conventional manner. Each chain link may have a chain post 96 extending perpendicularly outwardly therefrom. The chain links and, hence, the chain posts 96, are preferably spaced complementary to the spacing between the perforations 88 in the film edges. In this manner, the chain posts may engage the perforations 88 such that the film 86 is retracted and deployed along the track assembly 98.

Figure 3A:
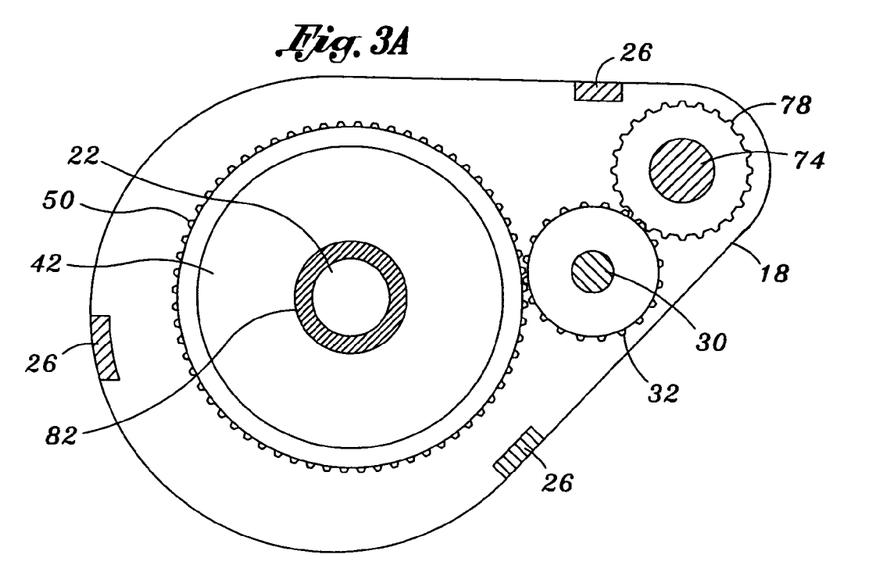
FIG. 3a is an end view of the spool assembly taken along lines 3a-3a of FIG. 3 and illustrating an end plate having a spool shaft and a motor mounted thereon.
Figure 3B:
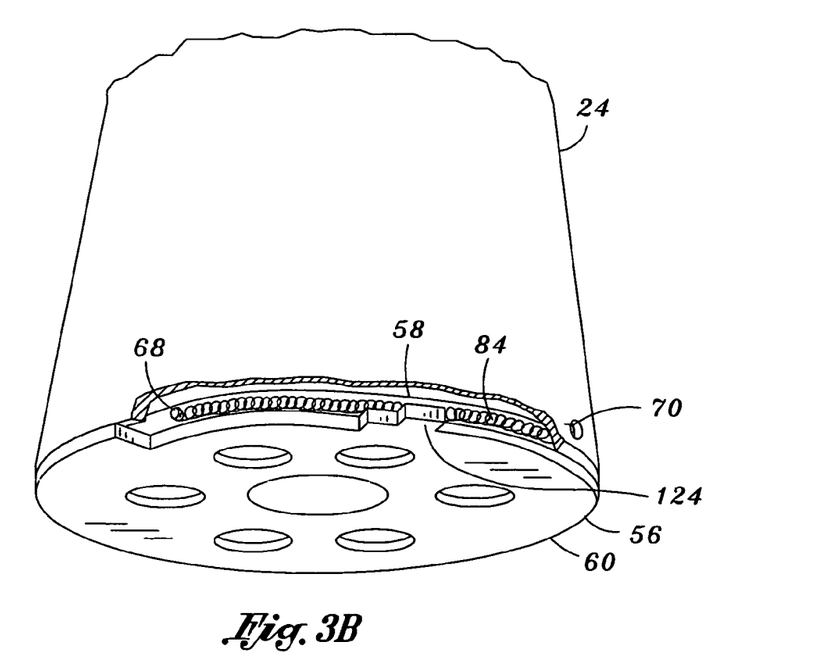
FIG. 3b is a partially cut-away perspective view of the spool and illustrating an end cap and a sleeve gear mounted adjacent a spool drum.
Figure 3D:
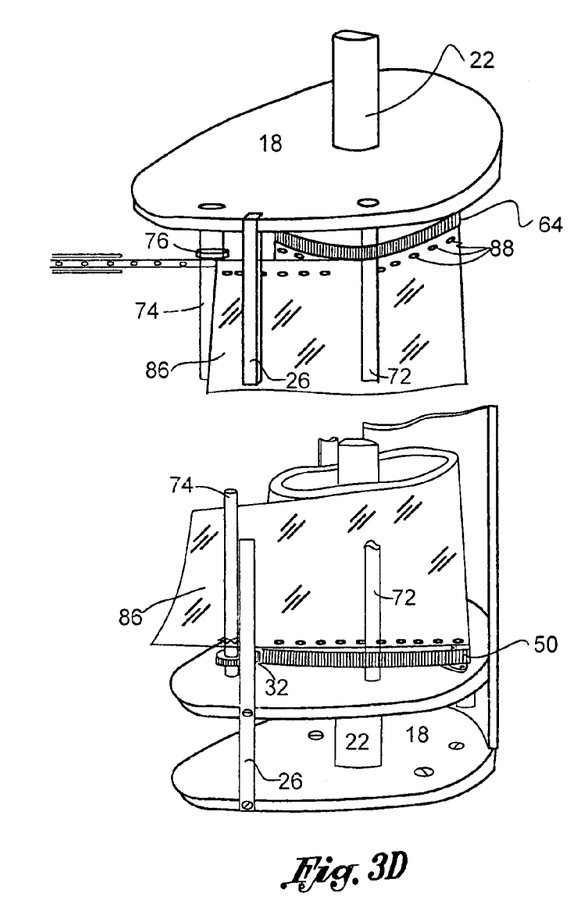
FIG. 3d is a perspective view of the retractable window shade illustrating the arrangement of the spool assembly and the film drive mechanism comprised of the drive chain and perforations in the film edges.

Also shown in FIG. 3a is at least one and, preferably, three separate reinforcing bars 26 that extend between the end plates 18 in order to maintain the end plates 18 in fixed relationship with one another and also to provide structural rigidity to the mounting frame. The end plates 18 are preferably arranged to be in generally parallel but slightly inwardly sloping arrangement relative to one anther. It should be noted that the mounting frame itself may be secured to the motor vehicle using a set of mechanical fasteners such as screws that may be extended through screw holes formed in the base bracket 14 and/or end brackets 16 although any suitable manner may be utilized for securing the mounting frame to the motor vehicle. Preferably, the mounting frame is removable. In this manner, the spool assembly 12 may be secured to the appropriate locations in the pillar 154 and under the dashboard 158 of the motor vehicle adjacent the windshield.

Figure 2:
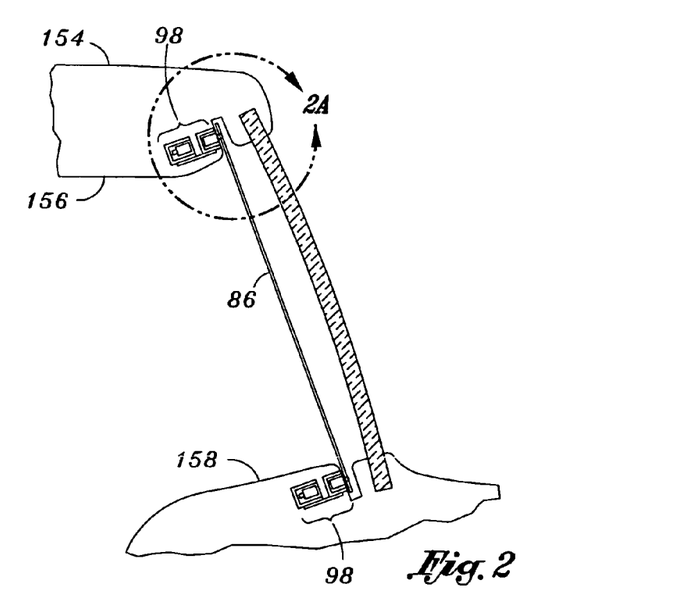
FIG. 2 is a cross-sectional view of the retractable window shade taken along lines 2-2 of FIG. 1 illustrating the installation thereof adjacent the windshield and further illustrating a pair of track assemblies mounted adjacent upper and lower edges of the windshield.
Figure 2A:
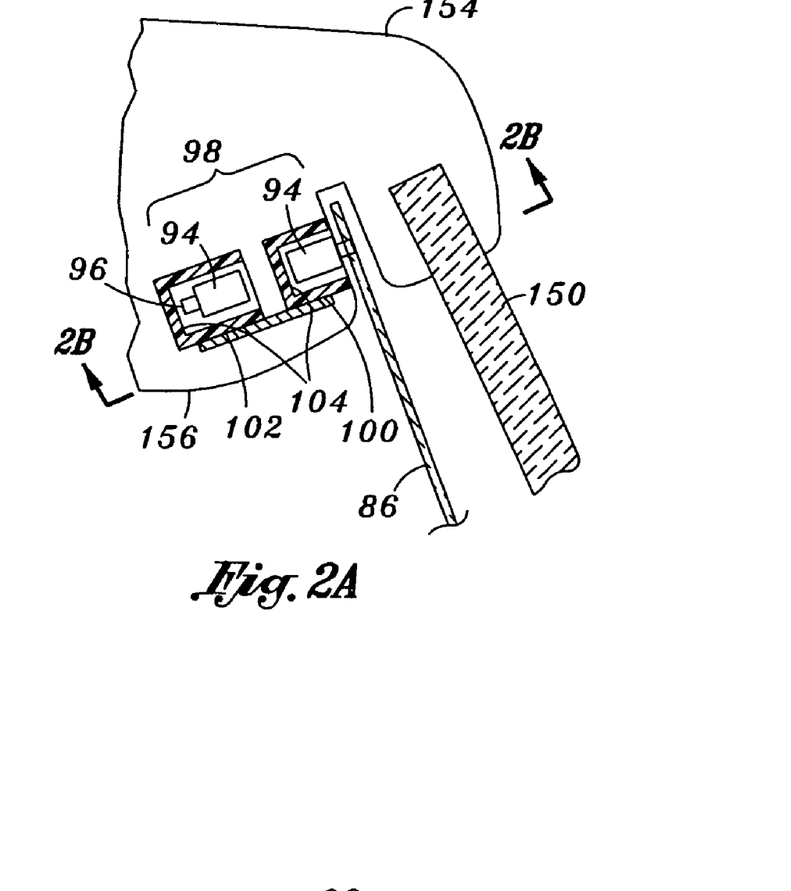
FIG. 2a is an enlarged cross-sectional view of one of the track assemblies of FIG. 2 and illustrating an inner and outer track and a drive chain supported thereby.
Figure 2B:
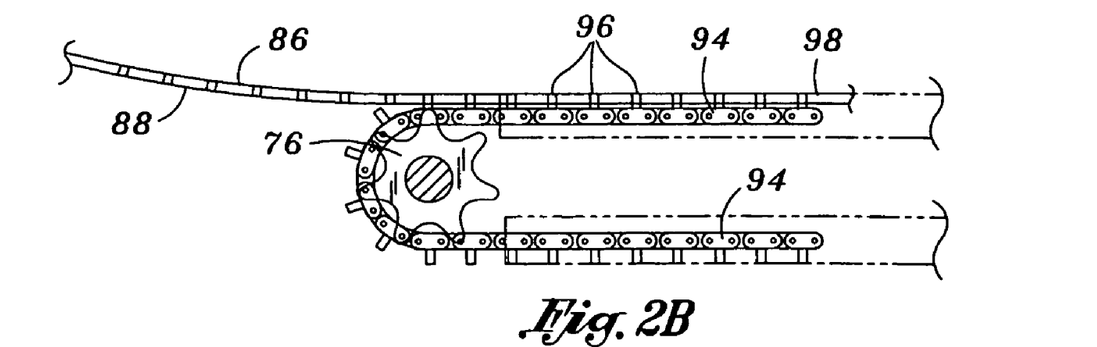
FIG. 2b is a side view of the track assembly taken along lines 2b-2b of FIG. 2a and illustrating a sprocket for supporting the chain.

Referring now to FIGS. 2 and 2a, shown is the track assembly 98 which may be installed inside of the roof 154 and/or hood/dashboard 158 of the motor vehicle. As was earlier mentioned, the track assembly 98 is comprised of inner and outer tracks 100, 102 which are disposed in stacked arrangement relative to one another. Each of the inner and outer tracks 100, 102 may have a generally U-shaped configuration with the inner track 100 having a track groove 104 formed therealong. The drive chain 94 is operatively supported by the track assembly 98 and, as shown in FIG. 2*b*, is configured to ride within the U-shaped openings formed in each of the inner and outer tracks 100, 102.

The drive chain 94 is preferably of an endless loop configuration although the drive chain 94 may have opposing free ends that are independently secured. As was earlier mentioned, the drive chain 94 includes the chain posts 96 extending laterally outwardly therefrom and being spaced in general registry with the perforations 88 of the film 86. The track assembly 98 may be directly secured to the motor vehicle such as in an interior of a headliner 156 of the roof 154. Alternatively, the track assembly 98 may be comprised of individual inner and outer track 100, 102 components that are separably mounted to the motor vehicle.

As was earlier mentioned, the drive chain 94 may be a conventional drive chain 94 comprised of a series of chain links each of which is itself comprised of a roller, side plates and inner plates that are secured in together by rivets or other mechanical fasteners. In this regard, the drive chain 94 may be configured similar to the arrangement of a bicycle chain with the exception that the drive chain 94 of the present invention includes the laterally outwardly extending chain posts 96 that are provided to engage the perforations in the film 86 edges.

The track assembly 98 is preferably installed adjacent to upper and lower edges of the windshield 150 and is fixably or removably mounted thereto. The drive chain 94 is mounted and driven by the sprockets 76 of the spool assemblies 12 which may be mounted on opposite sides of the windshield. For configurations of the retractable window shade 10 having a pair of the spool assemblies 12 mounted on opposing sides of the windshield, the drive chain 94 passes around the sprockets 76 and rides within the U-shaped grooves of the inner and outer tracks 100, 102. In this regard, it is contemplated that the pillars 152 each include an aperture 48.

The apertures 48 formed in the pillars 152 are preferably sized and configured to allow the drive chain 94 to pass therethrough. Rotation of the motor 28 causes the spool drum 24 as well as the sprocket spindle 74 and roller spindle 72 to simultaneously rotate. As the leading edge 90 of the film 86 unwinds from the spool drum 24 and the film 86 passes through the slot formed in the pillar 152, the sprocket teeth 80 engage the drive chain 94 which sequentially engages the film 86 so that the film may be extended along the windshield 150. The film 86 is preferably a flexible member to facilitate its movement along the curved track assemblies 98 mounted along the upper and lower edges of the curved windshield 150. It should also be noted that each of the track assemblies 98 may be installed so as to be hidden from view.

Referring back to FIGS. 3-5, mounted on the end plate 18 is the motor 28 which may be configured as a reversible motor 28 in order to effectuate retraction and deployment of the film 86. The motor 28 has a motor shaft 30 which extends axially outwardly therefrom and which terminates at a motor gear 32. As can be seen in FIG. 3, the sprocket spindle 74 and main gear 50 of the clutch assembly 34 are cooperatively engaged to the motor gear 32 such that rotation of the motor 28 effectuates rotation of the sprocket spindle 74 and main gear 50.

Engagement of the spool assembly 20 (i.e., rotation of the spool 20) is effectuated through manipulation of the clutch assembly 34. The clutch assembly 34 comprises a clutch gear 42, an axially moveable fork handle 36, a main gear 50 and a sleeve gear 56, each of which may be mounted on the spool shaft 22. In this regard, the above-recited components may be mounted on the spool shaft 22 by means of a bearing 82 or other friction-reducing component. Referring now to FIGS. 4 and 5, the sling 36 comprises a pair of fork 40 elements that are configured to engage a circumferential clutch groove 44 formed in one side of the clutch gear 42. An opposite side of the fork handle 36 has an extension 38 which is supported by and which passes axially through the end plate 18 at the proximal end of the retractable window shade 10. In this regard, the fork handle 36 is only axially moveable and is configured to effectuate axial movement of the clutch gear 42 on the spool shaft 22.

Disposed opposite the side from which the circumferential clutch groove 44 is formed on the clutch gear 42 is a plurality of axially extending clutch posts 46. The clutch posts 46 are configured to pass through a corresponding set of through holes 54 formed in the main gear 50. As can be seen in FIG. 4, the main gear 50 includes gear teeth 52 formed therearound which are preferably configured complementary to teeth formed on the motor gear 32. The clutch posts 46 of the clutch gear 42 are also preferably configured to be at a height sufficient to engage a plurality of corresponding bores 62 formed in the sleeve gear 56. As can be seen in FIG. 4, the sleeve gear 56 is independently movable but is rotatably engaged by the clutch posts of the clutch gear 42.

Upon rotational movement of the motor 28, the main gear 50 is also rotatable with the clutch gear 42. Movement of the sling 36 toward the distal end causes the clutch posts 46, which pass through the through holes 54, to extend into and engage the bores 62 of the sleeve gear 56. Resultant rotation of the sleeve gear 56, in turn, causes the spool 20 to rotate when a stop member 124 formed on the sleeve gear 56 engages a stop member 124 formed on the spool drum 24. When the stop members 124 engage one another, the film 86 is windable onto the spool drum 24. When the stop member 124 of the sleeve gear 56 disengages the stop member 124 of the spool drum 24, movement of the film 86 ceases. As can be seen in FIG. 5, the sleeve gear 56 is generally disk-shaped and may be comprised of an outer disc 60 and an inner disc 58. The outer disc 60 has bores 62 extending at least partially axially therethrough.

The stop member 124 of the sleeve gear 56 is disposed on a peripheral circumference thereof and is configured to engage the stop member 124 extending axially outwardly from the spool drum 24. Importantly, the sleeve gear 56 is configured to rotate relative to the spool drum 24 and is biased against the stop member 124 by a spring 84 which is connected to the spool drum 24 via a spring tab 70 formed thereon. An opposite end of the spring 84 passes through a spring passageway 66 formed in the end cap 64 on the proximal end and is engaged to a spring post 68 disposed on the outer disc 60. In this manner, the rotation of the spool drum 24 is slightly faster than the sleeve gear 56 following engagement of the sleeve gear 56 by the clutch assembly 34. Ideally, the opposing ends of the spring 84 are disposed equidistant from the stop member 124 of the spool drum 24. The inner disc 58 preferably has a thickness that is complementary to a width of the spring 84 such that the spring 84 may ride on an outer periphery of the inner disc 58 during relative rotational movement between the spool drum 24 and the sleeve gear 56.

During retraction of the film 86 (i.e., during winding thereof upon the spool drum 24), actuation of the motor 28 causes simultaneous rotation of the sprocket spindle 74 and the main gear 50. With the clutch assembly 34 in an engaged position such that the clutch posts 46 of the clutch gear 42 are drivingly engaged to the sleeve gear 56, a time lag occurs between the start of movement of the drive chain 94 carrying the film 86 to engagement of the stop members 124 of the sleeve gear 56 and spool drum 24 which prevents undue tension in the film 86 during rewinding. Such undue tension could result in unwanted stretching and/or splitting (i.e., breakage) of the film 86. As was earlier mentioned, the roller spindle 72 acts to apply a slight amount of pressure to the film 86 onto the spool drum 24 to keep a certain amount of tension in the film during wind. In this manner, the film may be even wound onto the spool without formation of bumps or lumps in the film 86 on the spool drum 24.

Appropriate control switches may be mounted on the mounting assembly in a conveniently accessible location. Alternatively, such control switches may be integrated into the controls of the motor vehicle and into which the retractable window shade 10 is installed. In this regard, an activation switch may be provided for the clutch assembly 34 and the motor 28 to be activated almost simultaneously. Four separate activation switches may be provided for motor vehicles having a plurality of the retractable window shades 10. For example, a retractable window shade 10 may be installed for the windshield 150 as well as for the rear window of the motor vehicle. Likewise, each of the driver and passenger door 160 windows may include a retractable window shade 10.

Regarding the installation of the track assembly 98 on the upper edge of the windshield 150, for certain configurations of motor vehicles such as for automobiles manufactured by Mercedes-Benz Automobile Company, the rearview mirror may be installed on the headliner 156 and/or roof 154 instead of on the interior of the windshield 150. For such configurations, the rearview mirror is preferably relocated to a position adjacent to the visor which is typically installed above the driver position. A three-way folding mirror may optionally be utilized wherein a left rearview mirror, a right rearview mirror and a direct rearview mirror may be integrated in order to avoid interference between the operation of the retractable window shade 10 on the windshield 150.

Figure 6:
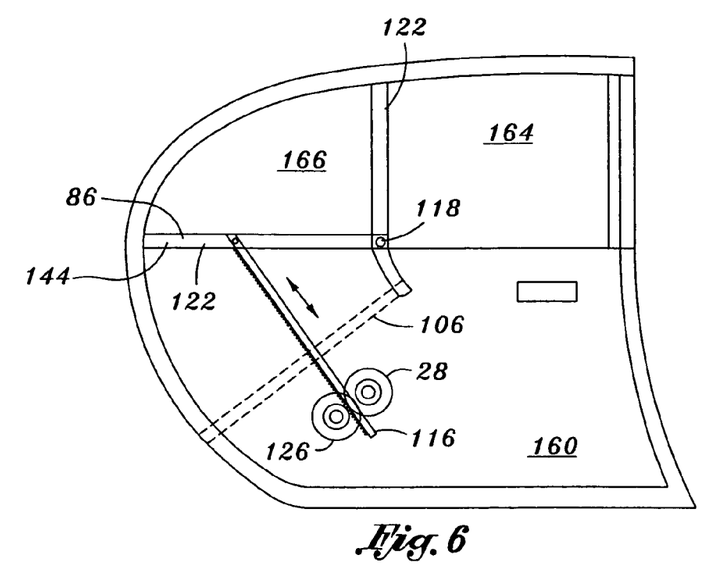
FIG. 6 is a side view of the retractable window shade configured as may be mounted inside a passenger door of a motor vehicle.
Figures 7, 7A:
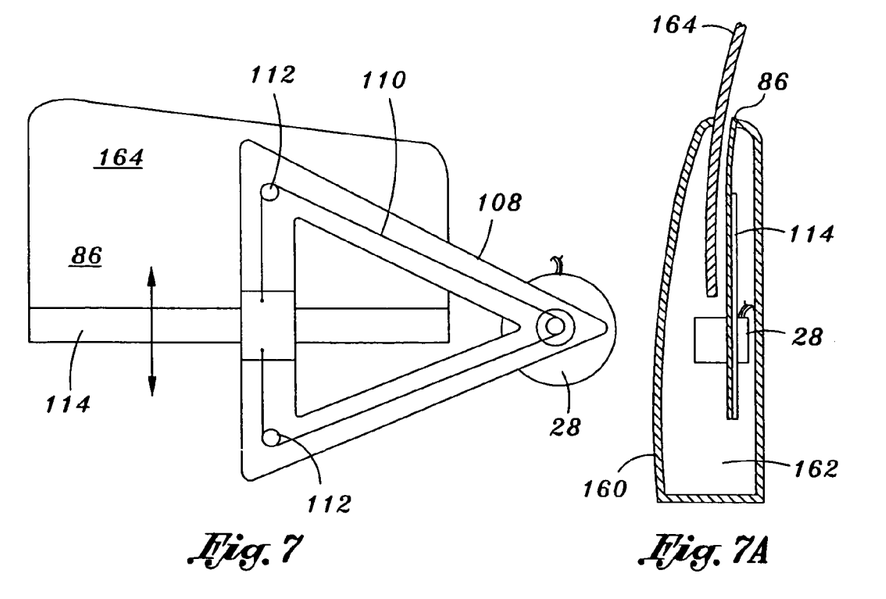
FIG. 7 is a side view of the retractable window shade configured for installation adjacent a main passenger door window.
FIG. 7a is a cross-sectional view of the retractable window shade as installed in a passenger door.

Referring now to FIGS. 6-7a, shown is the retractable window shade 10 in further embodiments that are specifically adapted for mounting inside of a passenger door 160. In such passenger door 160 installations, the film 86 may only be activated (i.e., extended) when the window of the passenger door 160 is in a fully closed position. The retractable window shade 10 in the embodiment shown in FIG. 6 is specifically adapted for shading a rear passenger door window 166 of a motor vehicle such as an automobile. The retractable window shade 10 of FIGS. 7 and 7a is specifically adapted for shading a forward passenger door window 164 of a motor vehicle such as an automobile.

Referring more particularly now to FIG. 6, shown is the retractable window shade 10 in the embodiment for a rear passenger door window 166. As was described above for the retractable window shade 10 for the windshield 150, the retractable window shade 10 of FIG. 6 is adapted to be retracted and deployed upon the inside surface of the window and, in this manner, is disposed against the side window at a relatively close distance therefrom. Unlike the side door windows of most sedans which are moveable up and down, the rear passenger door window 166 is typically non-moveable.

As can be seen in FIG. 6, the retractable window shade 10 includes a door mount assembly 106 that may be installed within the interior portion 162. The door mount assembly 106 is comprised of a motor 28 such as a reversible motor 28, a gear track 116 and a lifter frame 114 having the film 86 supported thereupon. The reversible motor 28 may have the motor shaft extending axially outwardly therefrom and which terminates at the motor gear. The gear track 116 is a generally elongate member which has opposing ends with one of the ends being engaged to the motor 28. In this regard, the gear track 116 includes a set of teeth that are configured complementary to and engageable with the teeth of the motor gear. Optionally, the door mount assembly 106 may further include a drive gear 126 disposed opposite that from the motor gear is located such that the gear track 116 is captured and engaged therebetween. The gear track 116 extends outwardly from the motor 28 and is pivotally connected to the lifter frame 114.

The lifter frame 114 is pivotally mounted into the upper structural member which may be an arcuate member. However, the lifter frame is preferably configured to be complementary to the shape or configuration of the rear passenger door as is shown in FIG. 6. The lifter frame 114 may have a generally triangular shape which may be comprised of a pair of radial members 122 joined together at a pivot point 118 and which are connected at opposite respective ends thereof. As shown in FIG. 6, the horizontally-oriented radial member may be engaged into an extension located below the pivot 118 which allows the radial member to rotate downwardly. Activation of the motor 28 effectuates linear translation of the gear track 116 and pivoting of the lifter frame 114 about the pivot point 118. In this manner, the door mount assembly 106 causes the lifter frame 114 to move the film 86 into at least partially overlapping relationship to the window.

Ideally, the lifter frame 114 generally matches or approximates the shape of the rear passenger door window 166 in order to increase the amount of shading effect. Therefore, it is contemplated that the lifter frame 114 may have a variety of shapes depending upon the shape of the rear passenger door window 166. For example, the lifter frame 114 may have a generally rectangular shape, a trapezoidal shape or any variation thereof including curved shapes of varying types. Furthermore, the lifter frame 114 may be mounted inside of the interior portion 162 at any location. For example, it is contemplated that the lifter frame 114 may be pivotally mounted to the rear portion of the rear passenger door window 166 and may pivot upwardly in a counter-clockwise direction contrary to the clockwise rotation as shown in FIG. 6.

A further embodiment of the retractable window shade 10 is illustrated in FIGS. 7 and 7a. As was earlier mentioned, such embodiment is mountable on either the passenger-side or driver-side doors 160. Furthermore, the retractable window shade 10 shown in FIGS. 7 and 7a is specifically adapted to be useable on either left-hand or right-hand sides of the motor vehicle with mirror-image versions of the retractable window shade 10. The film 86 for the side windows is preferably slightly thicker than the film 86 as used for the windshield 150 and rear window although the film 86 may be provided in any thickness relative to the film 86 for the windshield 150. It should also be noted that the film 86 is preferably extended along the window while the window is in the fully closed or up position.

As can be seen in FIG. 7, the retractable window shade 10 includes the door mount assembly 106 comprising a motor 28, a support frame 108, a lifter frame 114 and a cable 110 coupled to the lifter frame 114. The motor 28 may terminate at the motor gear. The support frame 108 may be fixably mounted to the door in a manner similar to that described above and shown in FIG. 6. The support frame 108 may have a generally triangular shape and may be oriented as shown in FIG. 7. The motor 28 may be preferably mounted at a lower one of the apexes of the support frame 108 with each of the other apexes having a pair of pulleys 112 mounted thereon.

The support frame 108 may further include a vertical leg having a vertically-oriented slot or groove to which is attached a lifter frame 114 that is specifically configured for supporting or lifting the film 86. However, the support frame 108 may include any means for effecting vertical movement of the lifter from 114. The lifter frame 114 may be configured as an elongate or rectangular shape having the film 86 supportably mounted therein. As shown in FIG. 7, the lifter frame 114 may be disposed transversely to a vertically-oriented leg of the support frame 108. The cable 110 is coupled to the motor 28 and extends around each one of the pulleys 112 and terminates at the lifter frame 114.

The retractable window shade 10 is specifically adapted such that activation of the motor 28 effectuates linear translation of the cable 110 about the pulleys 112 which causes the lifter frame 114 to move into at least partially overlapping relationship to the window. In this manner, the retractable window shade 10 may extend and retract the film 86 against the passenger door window. The lifter frame 114 is preferably configured in a manner similar to that described above for the non-moveable rear passenger door window 166.

Additional modifications and improvements of the present invention may also be apparent to those of ordinary skill in the art. Thus the particular combination of parts described and illustrated herein is intended to represent only certain embodiments of the present invention, and is not intended to serve as limitations of alternative devices within the spirit and scope of the invention.

What is claimed is:

1. A retractable window shade, comprising:
   at least one spool assembly, including;
   a spool having film windable thereupon with opposing film edges having spaced perforations extending therealong;
   a motor;
   a clutch assembly, disposed at one end of the spool, configured to rotatably couple the motor to the spool;
   the clutch assembly comprising a clutch gear axially slidable on a spool shaft and being disposed on a proximal side of a motor gear and having opposing sides with a circumferential clutch groove being disposed on one of the sides and a plurality of clutch posts extending axially outwardly from the other one of the sides;
   an axially movable sling having a pair of forks, the sling being operatively coupled to the clutch gear for effectuating axial movement thereof, the forks being sized and configured complementary to the clutch groove so as to be slidingly engageable therewithin;
   a main gear rotatably mounted on the spool shaft and being engaged to the motor gear and having a plurality of through holes equal in quantity to the clutch posts and being configured for slidingly passing the clutch posts therethrough; and
   a sleeve gear rotatably mounted on the spool shaft on a side of the main gear opposite that of the clutch gear and having a plurality of bores extending at least partially therein, the bores being equal in quantity to and sized complementary to the clutch posts;
   wherein axial movement of the sling and clutch gear causes engagement of the clutch posts to the bores causing rotation of the sleeve gear in unison with the main gear; and
   at least one sprocket coupled to the motor and being~disposed in alignment with the perforations; and
   at least one track assembly oriented generally perpendicularly relative to the spool assembly and including a drive chain engaged to the sprocket and being configured to engage the perforations for extending and retracting the film during activation of the motor.

2. The retractable window shade of claim 1 wherein activation of the motor causes rotation of the spool simultaneous with rotation of the sprocket for extending and retracting the film.

3. The retractable window shade of claim 1 wherein the motor is reversible.

4. The retractable window shade of claim 1 wherein each one of the track assemblies comprises an inner and outer track disposed in parallel relation to one another and being configured to support the drive chain.

5. The retractable window shade of claim 1 wherein:
   the spool assembly is mounted adjacent to one of opposing sides of a windshield on an inside thereof, the windshield having upper and lower edges;
   the pair of track assemblies being mounted adjacent to respective ones of the upper and lower edges.

6. The retractable window shade of claim 5 wherein each one of the windshield sides has a pair of the spool assemblies mounted adjacent thereto.

7. The retractable window shade of claim 6 wherein the spool assembly is configured such that activation of the motor causes the film to at least partially extend across the windshield.

8. The retractable window shade of claim 1 wherein the windshield is an automobile windshield.

9. The retractable window shade of claim 8 wherein:
   the automobile includes a roof and a dashboard;
   the pair of track assemblies being mounted adjacent to respective ones of the roof and dashboard.

10. A retractable window shade, comprising:
    a spool assembly, comprising;
    a mounting assembly having proximal and distal ends and including:
       a base bracket;
       a pair of spaced end brackets disposed at respective ones of the proximal and distal ends and being secured to the base bracket; and
       a pair of end plates mounted to the base bracket and disposed in spaced parallel relation to corresponding ones of the end brackets;
    a spool, comprising:
       a spool shaft supported at opposing ends by the end plates and end brackets;
       a spaced pair of end caps bearingly supported on the spool shaft;
       an elongate, conically shaped spool drum fixedly supported by the end plates such that the spool drum is rotatably mounted on the spool shaft; and
       film windable upon the spool drum, the film having opposing film edges with equidistantly spaced perforations extending therealong, the film having a leading edge and a trailing edge secured to the spool drum;
    a reversible motor having a motor shaft extending axially outwardly therefrom and terminating at a motor gear;
    an axially engageable clutch assembly configured to rotatably couple the motor to the spool, the clutch assembly comprising:
    a clutch gear axially slideable on the spool shaft and being disposed on a proximal side of the motor gear and having opposing sides with a circumferential clutch groove being disposed on one of the sides and a plurality of clutch posts extending axially outwardly from the other one of the sides;
    an axially movable sling having a pair of forks, the sling being operatively coupled to the clutch gear for effectuating axial movement thereof, the forks being sized and configured complementary to the clutch groove so as to be slidingly engageable therewithin;
    a main gear rotatably mounted on the spool shaft and being engaged to the motor gear and having a plurality of through holes equal in quantity to the clutch posts and being configured for slidingly passing the clutch posts therethrough; and
    a sleeve gear rotatably mounted on the spool shaft on a side of the main gear opposite that of the clutch gear and having a plurality of bores extending at least partially therein, the bores being equal in quantity to and sized complementary to the clutch posts;

wherein axial movement of the sling and clutch gear causes engagement of the clutch posts to the bores causing rotation of the sleeve gear in unison with the main gear;

a roller spindle rotatably supported by the end plates and being configured to apply pressure to the film during rotation thereof; and a sprocket spindle rotatably supported by the end plates and having a sprocket gear mounted thereon for engaging the motor, the sprocket spindle having a pair of sprockets disposed on opposite ends thereof in alignment with the film perforations, each of the sprockets having a plurality of radially extending sprocket teeth; and a pair of track assemblies disposed in general alignment with the film perforations of the opposing edges of the film for engagement thereof film during extension and retraction, each one off the track assemblies having an endless loop chain mounted thereon and passing around one of the sprockets in engagement with the sprocket teeth, the chain having a plurality of chain posts extending laterally outwardly therefrom for engaging the film perforations.

* * * * *

UNITED STATES PATENT AND TRADEMARK OFFICE
CERTIFICATE OF CORRECTION

| | | |
|---|---|---|
| PATENT NO. | : 7,493,933 B2 | Page 1 of 1 |
| APPLICATION NO. | : 11/504162 | |
| DATED | : February 24, 2009 | |
| INVENTOR(S) | : Xinian Li | |

It is certified that error appears in the above-identified patent and that said Letters Patent is hereby corrected as shown below:

On the title page:

Item (76), Inventor, replace "Xinia Li" with --Xinian Li--.

Signed and Sealed this

Fifth Day of May, 2009

JOHN DOLL
*Acting Director of the United States Patent and Trademark Office*